United States Patent
Hall et al.

(10) Patent No.: US 8,997,497 B2
(45) Date of Patent: Apr. 7, 2015

(54) GAS TURBINE ENGINE WITH VARIABLE AREA FAN NOZZLE

(75) Inventors: Andre M. Hall, East Hartford, CT (US); Gregory A. Kohlenberg, Kensington, CT (US); Jonathan Gilson, West Hartford, CT (US)

(73) Assignee: United Technologies Corporation, Hartford, CT (US)

(*) Notice: Subject to any disclaimer, the term of this patent is extended or adjusted under 35 U.S.C. 154(b) by 1121 days.

(21) Appl. No.: 12/915,208

(22) Filed: Oct. 29, 2010

(65) Prior Publication Data

US 2012/0109593 A1     May 3, 2012

(51) Int. Cl.
| | |
|---|---|
| *F02K 1/08* | (2006.01) |
| *F02K 1/30* | (2006.01) |
| *B64D 33/04* | (2006.01) |
| *F02K 1/09* | (2006.01) |

(52) U.S. Cl.
CPC . *F02K 1/30* (2013.01); *B64D 33/04* (2013.01); *F02K 1/09* (2013.01); *F05D 2250/712* (2013.01); *F05D 2250/713* (2013.01); *F05D 2250/711* (2013.01)

(58) Field of Classification Search
CPC .............. F02K 1/06; F02K 1/08; F02K 1/09; F02K 1/805
USPC ............ 60/226.1, 226.3, 230, 771, 239; 239/165.11, 265.35, 265.19, 265.23, 239/265.43
See application file for complete search history.

(56) References Cited

U.S. PATENT DOCUMENTS

| | | | |
|---|---|---|---|
| 3,820,719 A * | 6/1974 | Clark | 239/265.31 |
| 5,676,312 A | 10/1997 | Lapergue et al. | |
| 5,839,663 A * | 11/1998 | Broadway et al. | 239/265.35 |
| 6,751,944 B2 | 6/2004 | Lair | |
| 6,910,855 B2 | 6/2005 | Dailey et al. | |
| 6,938,408 B2 | 9/2005 | Lair | |
| 7,234,917 B2 | 6/2007 | Dailey et al. | |
| 7,647,713 B2 | 1/2010 | Malacrino | |
| 2009/0053058 A1 | 2/2009 | Kohlenberg et al. | |
| 2009/0208328 A1 | 8/2009 | Stern | |
| 2009/0260345 A1 | 10/2009 | Chaudhry | |
| 2009/0301056 A1 | 12/2009 | Hatrick | |
| 2009/0320488 A1 | 12/2009 | Gilson et al. | |
| 2010/0064659 A1 | 3/2010 | Wang et al. | |

(Continued)

FOREIGN PATENT DOCUMENTS

| | | |
|---|---|---|
| EP | 1972774 | 9/2008 |
| EP | 2050948 A2 * | 4/2009 |

(Continued)

OTHER PUBLICATIONS

European Search Report for European Patent Application No. 11186846.9 completed Nov. 4, 2014.

*Primary Examiner* — Phutthiwat Wongwian
*Assistant Examiner* — Marc J Amar
(74) *Attorney, Agent, or Firm* — Carlson, Gaskey & Olds, P.C.

(57) ABSTRACT

A bypass gas turbine engine includes a variable area fan nozzle with a second fan nacelle section axially movable relative to a first fan nacelle section to define an auxiliary port to vary a fan nozzle exit area and adjust fan bypass airflow. The second fan nacelle section includes a leading edge region that defines a concave external contour and the first fan nacelle section includes a trailing edge region that defines a convex internal contour.

16 Claims, 6 Drawing Sheets

(56) References Cited

U.S. PATENT DOCUMENTS

2010/0162684 A1    7/2010   Baker
2010/0170220 A1    7/2010   Kohlenberg

FOREIGN PATENT DOCUMENTS

EP           2138696     12/2009
WO    WO 2009029401 A2 *   3/2009

* cited by examiner

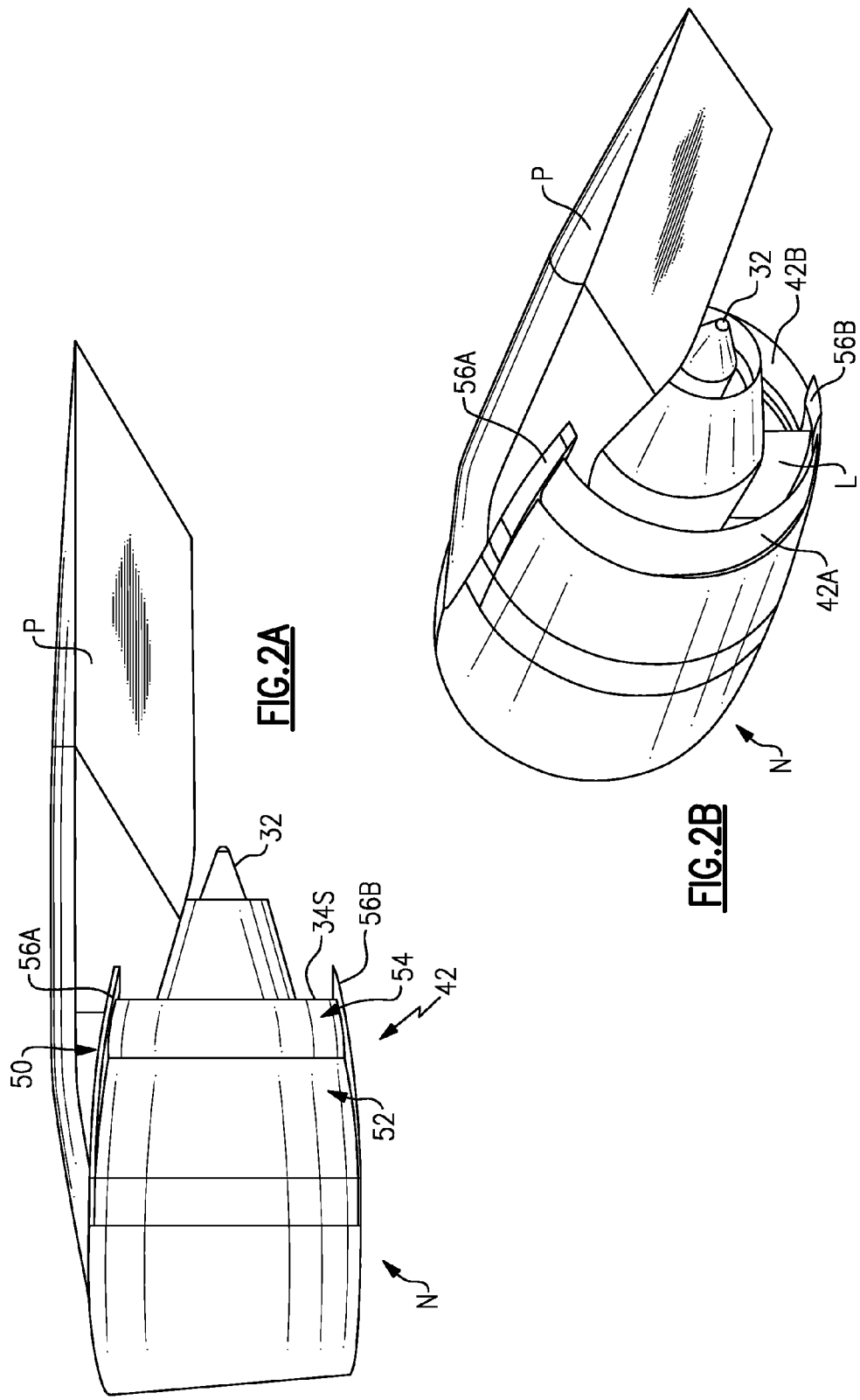

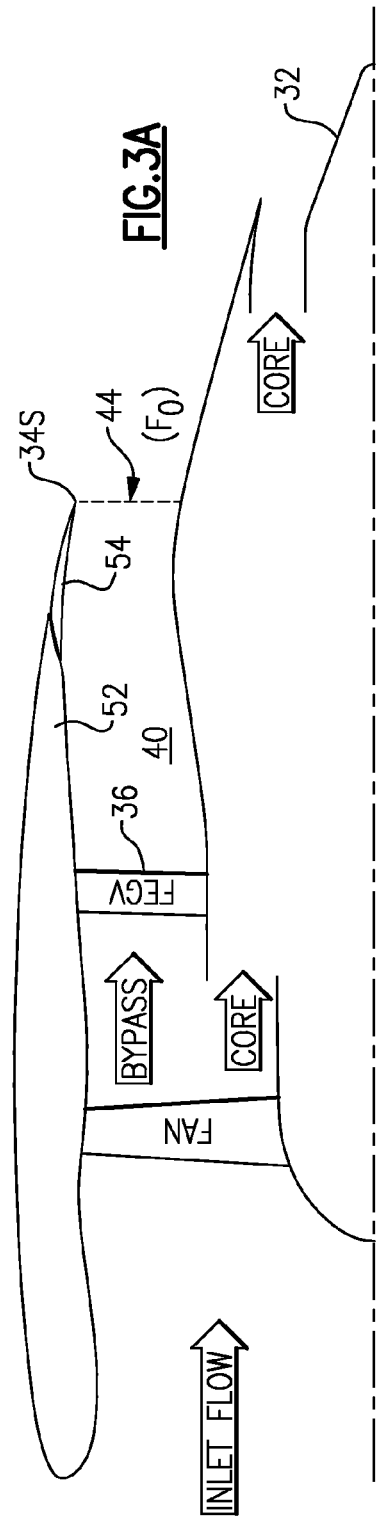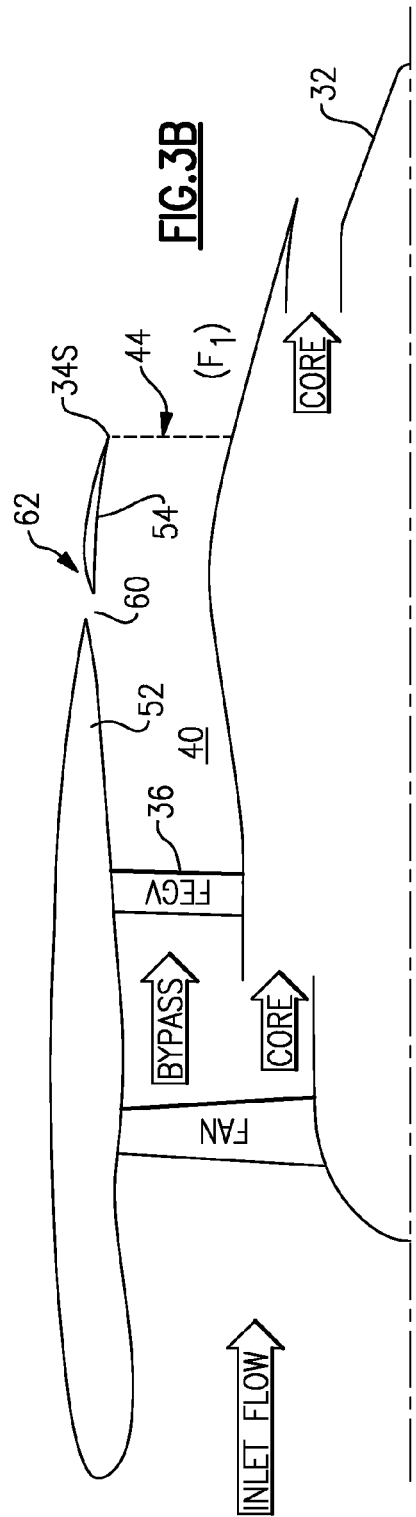

GAS TURBINE ENGINE WITH VARIABLE AREA FAN NOZZLE

BACKGROUND

The present disclosure relates to a gas turbine engine, and more particularly to a turbofan engine having a variable area fan nozzle (VAFN).

Gas turbine engines which have an engine cycle modulated with a variable area fan nozzle (VAFN) provide a relatively smaller fan nozzle exit area during cruise conditions and a relatively larger fan nozzle exit area during take-off and landing conditions. The VAFN may experience aerodynamic performance losses (total pressure losses) due to the contouring of the fixed and translatable fan nacelle structures.

SUMMARY

A nacelle assembly for a gas turbine engine according to an exemplary aspect of the present disclosure includes a variable area fan nozzle in communication with a fan bypass flow path, the variable area fan nozzle having a first fan nacelle section and a second fan nacelle section. The second fan nacelle section axially movable relative to the first fan nacelle section to define an auxiliary port to vary a fan nozzle exit area and adjust fan bypass airflow. The second fan nacelle section includes a leading edge region that defines a concave external contour and the first fan nacelle section includes a trailing edge region that defines a convex internal contour.

A method of reducing total performance losses of a gas turbine engine with a variable area fan nozzle according to an exemplary aspect of the present disclosure includes: designing a leading edge region of the second fan nacelle section, the shape of the leading edge region decoupled from the shape of a trailing edge region of the first fan nacelle section with respect to a closed position.

A method of reducing total performance losses of a gas turbine engine with a variable area fan nozzle according to an exemplary aspect of the present disclosure includes: designing a trailing edge region of the first fan nacelle section, independently designing a leading edge region of the second fan nacelle section to provide a decoupled separation plane with respect to the trailing edge.

BRIEF DESCRIPTION OF THE DRAWINGS

The various features and advantages of this disclosure will become apparent to those skilled in the art from the following detailed description of the currently embodiments. The drawings that accompany the detailed description can be briefly described as follows:

FIG. 2A is a side view of the engine integrated with a pylon;

FIG. 2B is a rear perspective view of the engine integrated with a pylon;

FIG. 3A is a sectional side view of the VAFN in a closed position;

FIG. 3B is a sectional side view of the VAFN in an open position;

DETAILED DESCRIPTION

Figure 1:
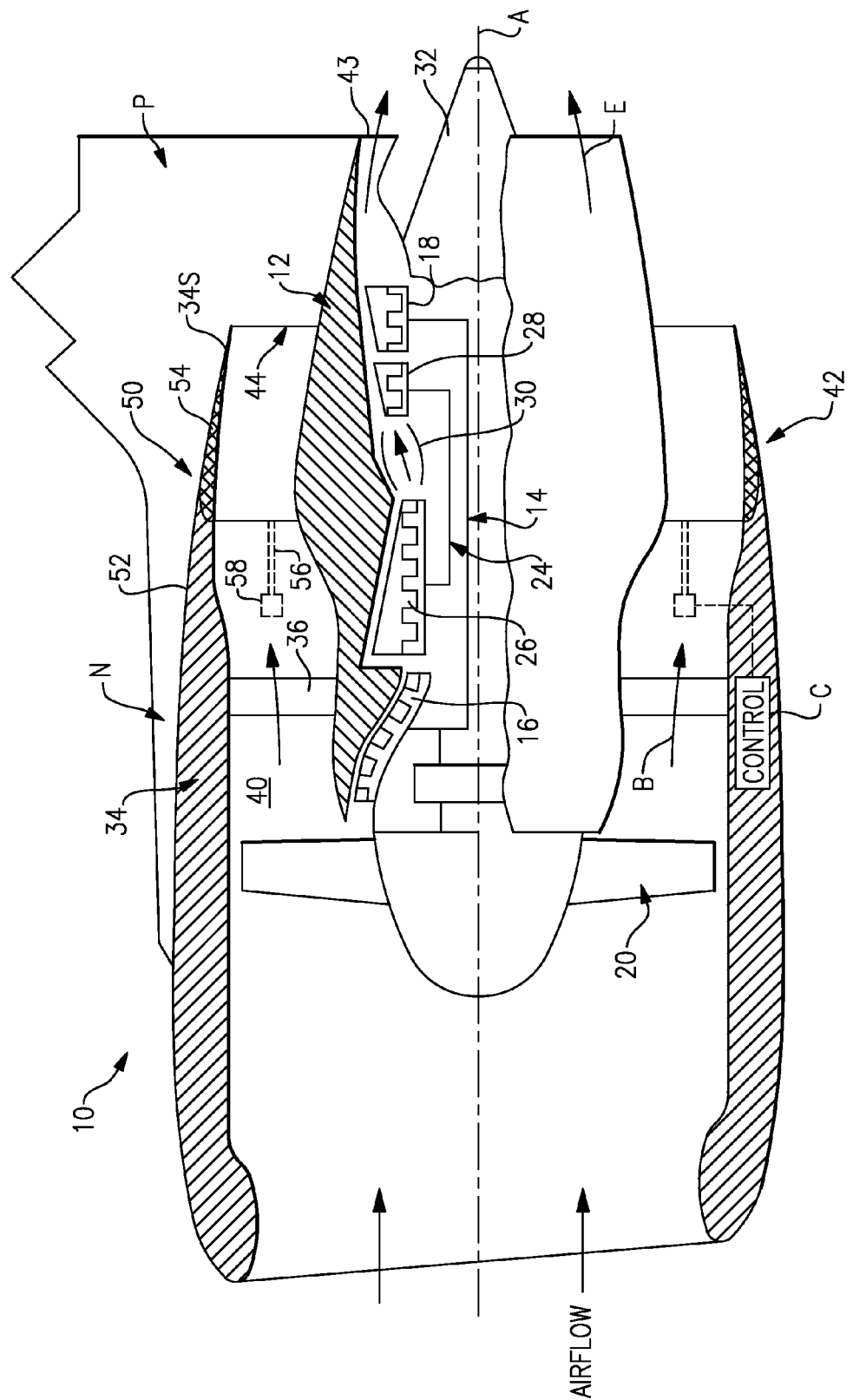
FIG. 1 is a general schematic partial fragmentary view of an exemplary gas turbine engine embodiment for use with the present disclosure.

FIG. 1 illustrates a general partial fragmentary schematic view of a gas turbofan engine 10 suspended from an engine pylon P within an engine nacelle assembly N as is typical of an aircraft designed for subsonic operation. It should be understood, however, that this disclosure is applicable to various other gas turbine engines.

The turbofan engine 10 includes a core engine within a core nacelle 12 that houses a low spool 14 and high spool 24 that rotate about an engine axis of rotation A. The low spool 14 includes a low pressure compressor 16 and low pressure turbine 18. The low spool 14 also drives a fan section 20 either directly or through a geared architecture. The high spool 24 includes a high pressure compressor 26 and high pressure turbine 28. A combustor 30 is arranged between the high pressure compressor 26 and high pressure turbine 28.

Airflow enters a fan nacelle 34, which at least partially surrounds the core nacelle 12. The fan section 20 communicates airflow into the core nacelle 12 to power the low pressure compressor 16 and the high pressure compressor 26. Core airflow compressed by the low pressure compressor 16 and the high pressure compressor 26 is mixed with the fuel in the combustor 30 and expanded over the high pressure turbine 28 and low pressure turbine 18. The turbines 28, 18 are coupled for rotation with, respective, spools 24, 14 to rotationally drive the compressors 26, 16 and the fan section 20 in response to the expansion. A core engine exhaust E exits the core nacelle 12 through a core nozzle 43 defined between the core nacelle 12 and a tail cone 32. It should be understood that although a VAFN is illustrated in the disclosed non-limiting embodiment, any variable area nozzle will benefit herefrom.

The core nacelle 12 is supported within the fan nacelle 34 by circumferentially spaced structures 36 often referred to as Fan Exit Guide Vanes (FEGVs). A bypass flow path 40 is defined between the core nacelle 12 and the fan nacelle 34. The engine 10 generates a bypass flow arrangement with a bypass ratio in which a substantial percent of the airflow which enters the fan nacelle 34 becomes bypass flow B. The bypass flow B communicates through the generally annular bypass flow path 40 and is discharged from the engine 10 through a variable area fan nozzle (VAFN) 42 which defines a nozzle exit area 44 between the fan nacelle 34 and the core nacelle 12 at a fan nacelle end segment 34S of the fan nacelle 34 downstream of the fan section 20.

Thrust is a function of air density, velocity/acceleration, and air mass through the area. One or more of these parameters can be manipulated to vary the amount and direction of thrust provided by the bypass flow B. The VAFN 42 operates to effectively vary the area of the fan nozzle exit area 44 to selectively adjust the pressure ratio of the bypass flow B in response to a controller C. Low pressure ratio turbofans are desirable for their high propulsive efficiency. However, low pressure ratio fans may be inherently susceptible to fan stability/flutter problems at low power and low flight speeds. The VAFN allows the engine to change to a more favorable fan operating line at low power, avoiding the instability region, and still provide the relatively smaller nozzle area necessary to obtain a high-efficiency fan operating line at cruise.

A significant amount of thrust is provided by the bypass flow B due to the high bypass ratio. The fan section 20 of the engine 10 is preferably designed for a particular flight condition—typically cruise at 0.8M and 35,000 feet. As the fan blades within the fan section 20 are efficiently designed at a particular fixed stagger angle for an efficient cruise condition, the VAFN 42 is operated to effectively vary the fan nozzle exit area 44 to adjust fan bypass air flow such that the angle of attack or incidence on the fan blades is maintained close to the design incidence for efficient engine operation at other flight conditions, such as landing and takeoff to thus provide optimized engine operation over a range of flight conditions with respect to performance and other operational parameters such as noise levels.

The VAFN 42 generally includes a nozzle system 50 having a first fan nacelle section 52 and a second fan nacelle section 54 movable relative the first fan nacelle section 52. The second fan nacelle section 54 axially slides along the engine axis of rotation A relative the fixed first fan nacelle section 52 to change the effective area of the fan nozzle exit area 44. The second fan nacelle section 54, in one non-limiting embodiment, slides aftward upon a track fairing 56A, 56B (illustrated schematically in FIGS. 2A and 2B) in response to an actuator 58 (illustrated schematically). The track fairing 56A, 56B may extend from the first fan nacelle section 52 adjacent the respective pylon P and the lower Bi-Fi splitter L. The VAFN 42 may be separated into at least two sectors 42A-42B defined between the pylon P and a lower Bi-Fi splitter L which typically interconnects a larger diameter fan duct reverser cowl and a smaller diameter core cowl.

The VAFN 42 changes the physical area and geometry of the bypass flow path 40 during particular flight conditions. The bypass flow B is effectively altered by sliding of the second fan nacelle section 54 relative the first fan nacelle section 52 between a closed position (FIG. 3A) and an open position (FIG. 3B). The nozzle system 50 is closed by positioning the second fan nacelle section 54 in-line with the first fan nacelle section 52 to define the fan nozzle exit area 44 as exit area F0 (FIG. 3A). Movement of the second fan nacelle section 54 afterward along the track fairing 56A, 56B away from the first fan nacelle section 52 opens an auxiliary port 60 (FIG. 3B) defined between the open second fan nacelle section 54 and the first fan nacelle section 52 to essentially provide an increased fan nozzle exit area 44 exit area F1. That is, the exit area F1 with the auxiliary port 60 (FIG. 3B) is greater than exit area F0 (FIG. 3A).

In one non-limiting embodiment, the auxiliary port 60 is in communication with the bypass flow path 40 aft of the Fan Exit Guide Vanes 36 (FEGVs). It should be understood that various port arrangements are encompassed hereby.

In operation, the VAFN 42 communicates with the controller C to move the second fan nacelle section 54 relative the first fan nacelle section 52 of the nozzle system 50 to change the area defined by the fan nozzle exit area 44. Various control systems including an engine controller or an aircraft flight control system may also be usable with the present disclosure. By adjusting the axial position of the second fan nacelle section 54, engine thrust and fuel economy are maximized during each flight mode through variation of the fan nozzle exit area 44.

Figure 4A:
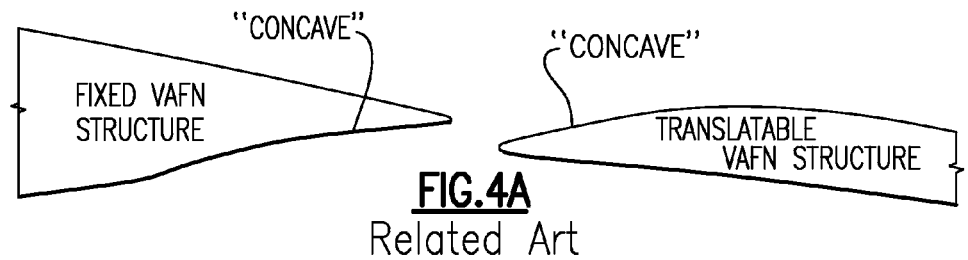
FIG. 4A is an expanded sectional side view of a RELATED ART VAFN in an open position.
Figure 4B:
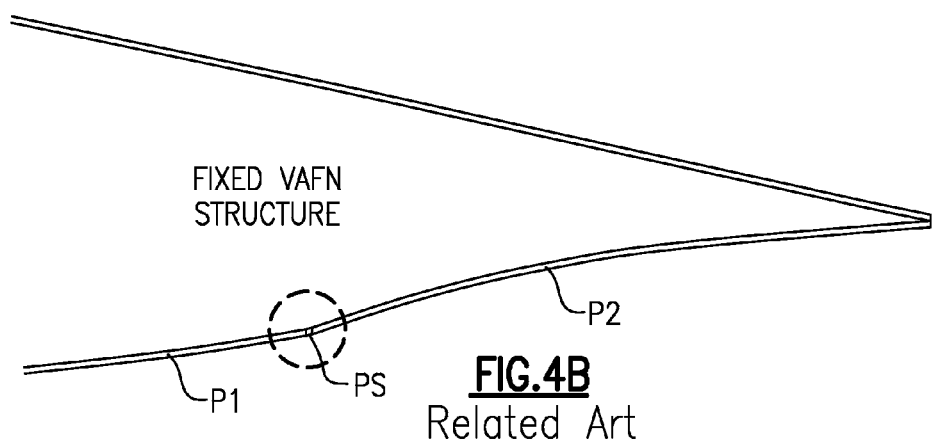
FIG. 4B is an expanded sectional view of the RELATED ART fixed VAFN structure construction.

A conventional art VAFN (RELATED ART; FIG. 4A) defines a concave separation plane with respect to the engine axis of rotation A for the auxiliary port as a result of the dependent structural design constraints. That is, the terms "concave" and "convex" (as utilized herein) are the contours of surfaces as defined about the engine axis of rotation A when reviewed along the axis. These design constraints require the internal contour of the fixed VAFN structure's trailing edge to fit or couple the external contour of the translating structure leading edge when in a closed position. Once the translating structure has been optimized (external curvature and leading edge shape) to maintain flow attachment for a range of conditions, the resultant internal contour of the upstream fixed VAFN structure is determined. Within this metric, the design of the trailing edge of the fixed VAFN structure is merely a consequence of the translating structure design. In other words, the coupling of these two surfaces along the separation plane, allows only one surface to truly be optimized. Functionality of the VAFN is achieved through an idealized separation plane between the upstream fixed and downstream translating structures that allows in-plane translation along the engine centerline axis of rotation without clashing of parts, and also enables both structures to mate securely when the VAFN is in a closed position. Manufacture of the fixed VAFN structure may form a seam near the trailing edge as a result of mating panels P1, P2 to conform to the change in contouring from an upstream surface P1 to the concave surface P2 of the fixed VAFN structure (RELATED ART; FIG. 4B). Mating of panels P1, P2 at seam PS may be a detriment to step and gap tolerance requirements and adversely impact boundary layer growth. This effect, combined with the local adverse pressure gradient present with a concave trailing edge contour, increases the potential for flow separation which may result in aerodynamic performance loss and increased noise.

Figure 5A:
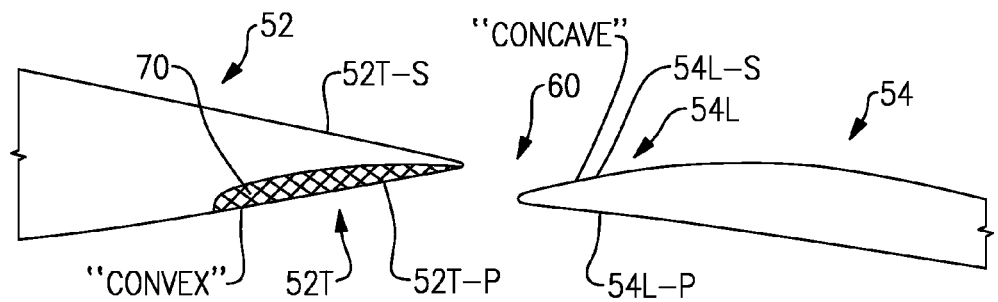
FIG. 5A is an expanded sectional side view of the VAFN in an open position.

With reference to FIG. 5A, the first fan nacelle section 52 includes a trailing edge region 52T that is shape decoupled from a leading edge region 54L of the second fan nacelle section 54. That is, the leading edge region 54L of the second fan nacelle section 54 and the trailing edge region 52T of the first fan nacelle section 52 are designed separately without concern for fit in a closed position (FIG. 5B).

The auxiliary port 60 is formed by the trailing edge region 52T of the first fan nacelle section 52 and the leading edge region 54L of the second fan nacelle section 54 which form a separation contour. The leading edge region 54L is defined by a suction surface 54L-S and a pressure surface 54L-P and the trailing edge region 52T is defined by a suction surface 52T-S and a pressure surface 52T-P. In one non-limiting embodiment, the leading edge region 54L defines a concave external contour on the suction surface 54L-S and the trailing edge region 52T defines a convex internal contour on the pressure surface 52T-P.

Figure 5B:
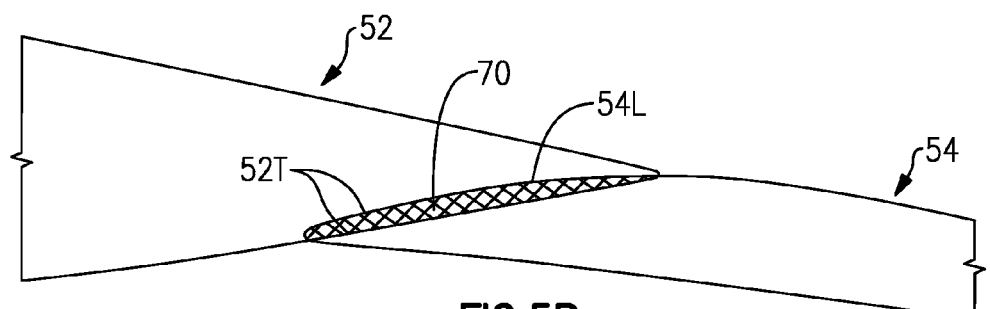
FIG. 5B is an expanded sectional side view of the VAFN in a closed position illustrating the convex surface and the concave surface overlap accommodated by a flexible surface.

To permit the concave external contour of the leading edge region 54L and the convex internal contour of the trailing edge region 52T to mate securely, even though the leading edge region 54L and the trailing edge region 52T would otherwise overlap in a closed position (FIG. 5B), a sufficiently aerodynamically rigid, yet mechanically flexible surface 70 may, in one non-limiting embodiment, be located within the pressure surface 52T-P of the trailing edge region 52T of the first fan nacelle section 52 (FIG. 5B).

The flexible surface 70 maintains the convex aerodynamic contour of the trailing edge region 52T of the first fan nacelle section 52 when the VAFN 42 is in the open position, yet deflects to a concave shape to receive the leading edge region 54L of the second fan nacelle section 54 when in the closed position to ensure an effective flow seal. That is, the flexible surface 70 within the trailing edge region 52T of the first fan nacelle section 52 selectively defines a seal pocket that may be mechanically compressed to a concave shape by the second fan nacelle section 54. It should be understood that various mechanically flexible surfaces may alternatively be utilized to accommodate the leading edge region 54L of the second fan nacelle section 54 into the trailing edge region 52T the first fan nacelle section 52 when the VAFN 42 is in a closed position.

A flexible surface 70 permits the shape of the leading edge region 54L of the second fan nacelle section 54 to be shape decoupled from the trailing edge region 52T of the first fan nacelle section 52 to facilitate the optimization of both to define the auxiliary port 60. In other words, the separate shape decoupled design requirements allow independent aerodynamic optimization.

Figure 5C:
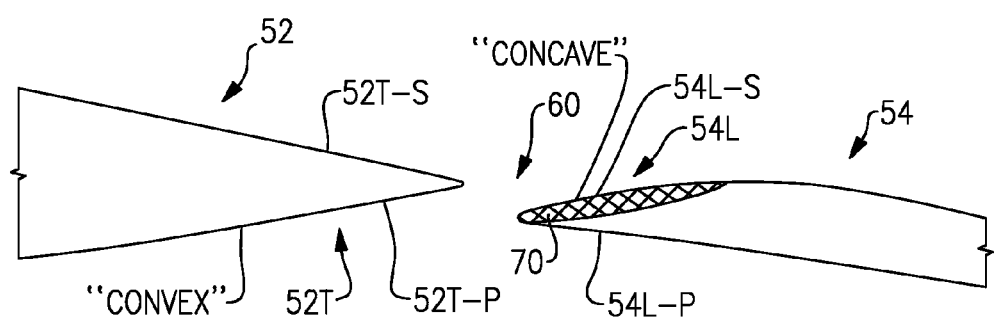
FIG. 5C is an expanded sectional side view of the VAFN in an open position to illustrate another non-limiting embodiment of the flexible surface.

Alternatively, the flexible surface 70 may, in another non-limiting embodiment, be located within the suction surface 54L-S of the leading edge region 54L of the second fan nacelle section 54 (FIG. 5C).

Figure 5D:
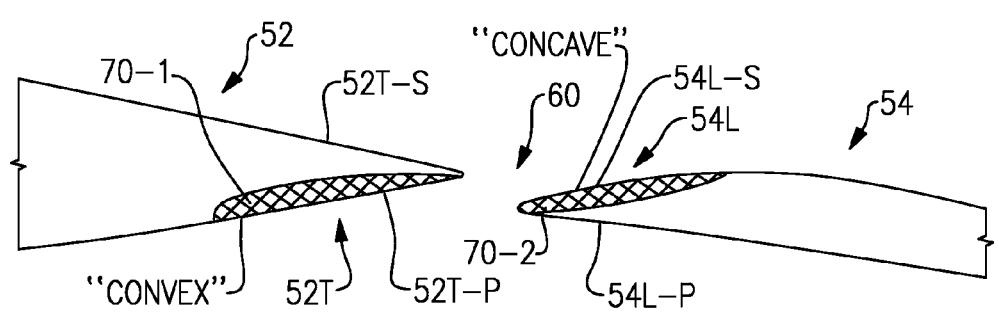
FIG. 5D is an expanded sectional side view of the VAFN in an open position to illustrate another non-limiting embodiment of the flexible surfaces.

Alternatively, the flexible surface 70 may, in another non-limiting embodiment, be located within both the suction surface 54L-S of the leading edge region 54L of the second fan nacelle section 54 as flexible surface 70-2 and the pressure surface 52T-P of the trailing edge region 52T of the first fan nacelle section 52 as flexible surface 70-1 such that the flexible surfaces 70-1, 70-2 mate with each other (FIG. 5D).

The independent optimization of the leading edge region 54L and the trailing edge region 52T significantly reduces aerodynamic performance losses associated with an increased adverse pressure gradient that otherwise results from the presence of a conventional complimentary shape coupled concave separation plane (FIG. 4A, RELATED ART).

Figure 6A:
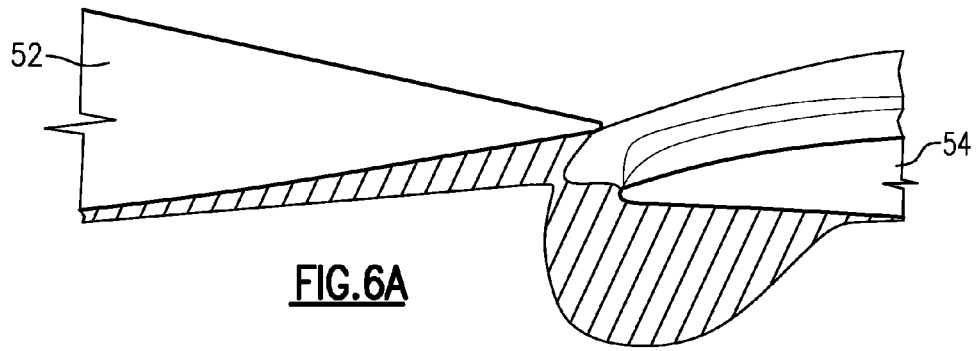
FIG. 6A is a Mach number contour as determined from Computational Fluid Dynamics (CFD) analysis of an independently optimized trailing edge contour (convex) designed according to the present disclosure.
Figure 6B:
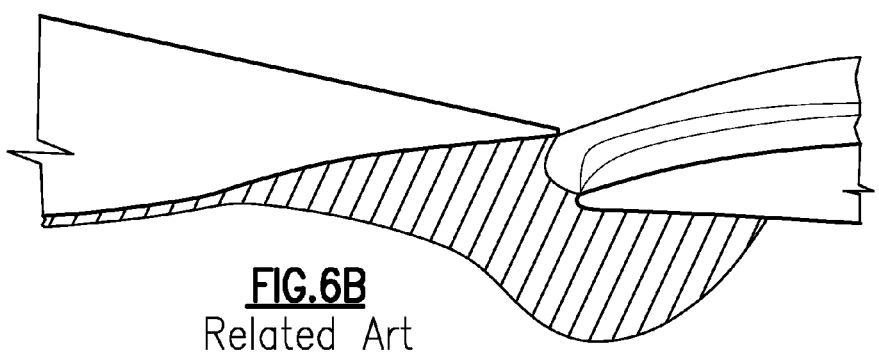
FIG. 6B is a Mach number contour as determined from CFD analysis of a RELATED ART non-independently optimized trailing edge contour (concave)
Figure 7A:
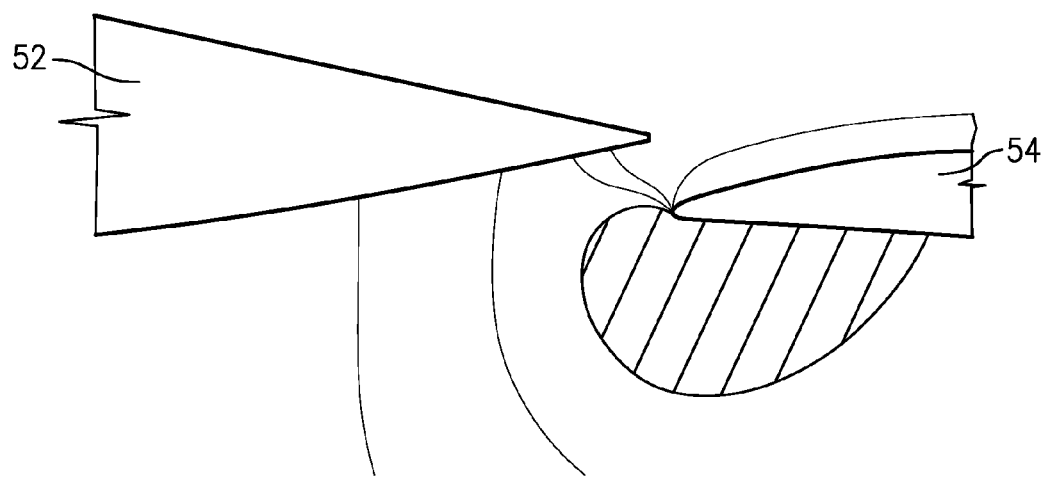
FIG. 7A is a static pressure contour as determined from CFD analysis of an independently optimized trailing edge contour (convex) designed according to the present disclosure.
Figure 7B:
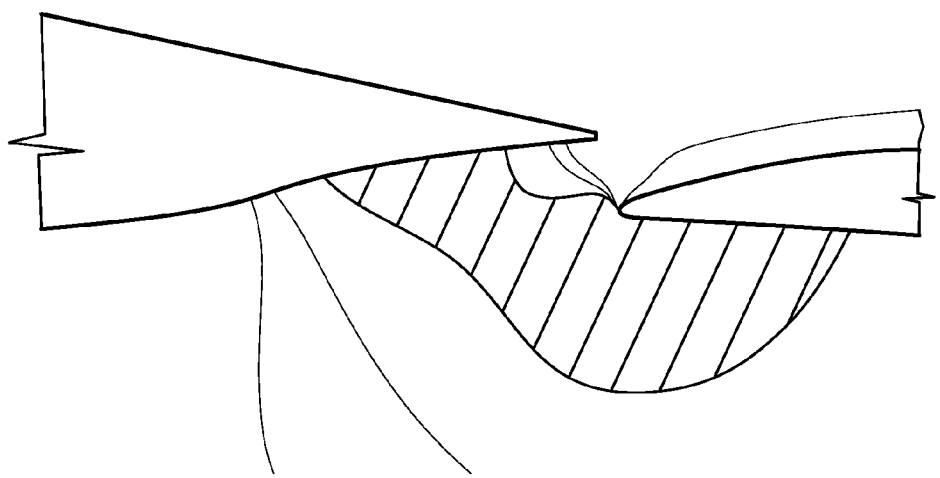
FIG. 7B is a static pressure contour as determined from CFD analysis of a RELATED ART non-independently optimized trailing edge contour (concave).

With reference to a Mach number contour comparison (FIGS. 6A and 6B) and static pressure contour comparison (FIGS. 7A and 7B) the independent optimization of the leading edge region 54L and the trailing edge region 52T (FIGS. 5A-5D) thereby provides a relatively clean airflow through the nozzle system 50 at a relatively higher velocity (FIGS. 6A and 6B) with a lesser flow gradient (FIGS. 7A and 7B) as compared to the conventional shape coupled concave separation plane (FIG. 4A).

The foregoing description is exemplary rather than defined by the limitations within. Many modifications and variations of the present disclosure are possible in light of the above teachings. The embodiments of this disclosure have been disclosed, however, one of ordinary skill in the art would recognize that certain modifications would come within the scope of this disclosure. It is, therefore, to be understood that within the scope of the appended claims, the disclosure may be practiced otherwise than as specifically described. For that reason the following claims should be studied to determine the true scope and content of this disclosure.

What is claimed is:

1. A nacelle assembly for a gas turbine engine comprising:
a core nacelle defined about an engine centerline axis of rotation;
a fan nacelle mounted at least partially around said core nacelle to define a fan bypass flow path;
a variable area nozzle in communication with said fan bypass flow path, said variable area nozzle having a first fan nacelle section and a second fan nacelle section, said second fan nacelle section axially movable relative said first fan nacelle section to define an auxiliary port to vary a fan nozzle exit area and adjust fan bypass airflow, said second fan nacelle section includes a leading edge region that defines a concave external contour that extends away from the engine centerline axis and said first fan nacelle section includes a trailing edge region that defines a convex internal contour that extends towards the engine centerline axis; and
a flexible surface mounted to at least one of an inner surface at said convex internal contour and an outer surface at said concave external contour.

2. The assembly as recited in claim 1, wherein said leading edge region of said second fan nacelle section includes a suction surface and a pressure surface, said concave external contour defines said suction surface of said leading edge region of said second fan nacelle section.

3. The assembly as recited in claim 1, wherein said trailing edge region of said first fan nacelle section includes a suction surface and a pressure surface, said convex internal contour defines said pressure surface of said trailing edge region of said first fan nacelle section.

4. The assembly as recited in claim 1, wherein said trailing edge region of said first fan nacelle section includes a suction surface and a pressure surface, said pressure surface includes said flexible surface.

5. The assembly as recited in claim 4, wherein said leading edge region of said second fan nacelle section mates with said flexible surface.

6. The assembly as recited in claim 1, wherein said leading edge region of said second fan nacelle section includes said flexible surface.

7. The assembly as recited in claim 6, wherein said trailing edge region of said first fan nacelle section includes a suction surface and a pressure surface, said pressure surface mates with said flexible surface.

8. The assembly as recited in claim 1, wherein said trailing edge region of said first fan nacelle section includes a first flexible surface and said leading edge region of said second fan nacelle section includes a second flexible surface.

9. The assembly as recited in claim 8, wherein said first flexible surface mates with said second flexible surface.

10. The assembly as recited in claim 1, wherein said auxiliary port is defined between said concave external contour and said convex internal contour.

11. The assembly as recited in claim 1, wherein said second fan nacelle section is downstream of said first fan nacelle section.

12. The assembly as recited in claim 1, wherein one said first fan nacelle section and said second fan nacelle section extends through a projection of a surface contour of the other said one of said first fan nacelle section and said second fan nacelle section when said second fan nacelle section is located in a closed position.

13. The assembly as recited in claim 12, wherein said surface contour defines said auxiliary port.

14. The assembly as recited in claim 12, wherein said surface contour extends from an edge of one of said leading edge region and said trailing edge region.

15. The assembly as recited in claim 6, wherein said flexible surface is deformable to define a concave geometry.

16. The assembly as recited in claim 1, wherein said flexible surface is deformable to receive the other said at least one of said inner surface and said outer surface within a pocket defined by said flexible surface when said second fan nacelle section is located in a stored position.

* * * * *